(12) United States Patent
Uozumi

(10) Patent No.: US 8,939,649 B2
(45) Date of Patent: Jan. 27, 2015

(54) ROLLING BEARING

(75) Inventor: Tomohisa Uozumi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/818,722

(22) PCT Filed: Sep. 7, 2011

(86) PCT No.: PCT/JP2011/070337
§ 371 (c)(1),
(2), (4) Date: Feb. 25, 2013

(87) PCT Pub. No.: WO2012/039282
PCT Pub. Date: Mar. 29, 2012

(65) Prior Publication Data
US 2013/0156360 A1    Jun. 20, 2013

(30) Foreign Application Priority Data

Sep. 22, 2010 (JP) ................................. 2010-212300

(51) Int. Cl.
*F16C 19/00*      (2006.01)
*F16C 33/38*      (2006.01)
(Continued)

(52) U.S. Cl.
CPC ......... *F16C 33/3887* (2013.01); *F16C 33/3875* (2013.01); *F16C 33/80* (2013.01); *F16C 33/7893* (2013.01); *F16C 33/6674* (2013.01)
USPC .......................................... 384/470; 384/523

(58) Field of Classification Search
CPC .. F16C 33/38; F16C 33/3806; F16C 33/3812; F16C 33/3862; F16C 33/3875; F16C 33/41; F16C 33/80

USPC .................. 384/470, 523, 526, 527, 531–534
See application file for complete search history.

(56) References Cited

U.S. PATENT DOCUMENTS 1,366,312 A * 1/1921 Danielsson .................... 384/526
4,451,098 A * 5/1984 Farley et al. ................... 384/526
(Continued)

FOREIGN PATENT DOCUMENTS

DE     102009038794 A1 * 3/2011
EP          1010909 A1 * 6/2000
(Continued)

OTHER PUBLICATIONS

Machine translation of EP 1707647 A1 obtained on Apr. 24, 2014.*
(Continued)

*Primary Examiner* — Thomas R. Hannon
*Assistant Examiner* — Adam D Rogers
(74) *Attorney, Agent, or Firm* — Wenderoth, Lind & Ponack, L.L.P.

(57) ABSTRACT

A rolling includes an inner race and an outer race, which rotate relative to each other, balls, which are interposed between the inner and outer races, and a retainer, which is arranged between the inner and outer races, for retaining the balls equiangularly. The retainer includes two annular members facing each other in an axial direction and having opposing surfaces each including hemispherical pockets formed in a plurality of circumferential positions, for receiving the balls, the two annular members being coupled together so that the opposing surfaces are brought into abutment on each other. A flange portion extends radially and is provided on a radially inner or outer side of an axial end portion of each of the two annular members.

11 Claims, 8 Drawing Sheets

(51) Int. Cl.
*F16C 33/80* (2006.01)
*F16C 33/78* (2006.01)
*F16C 33/66* (2006.01)

(56) References Cited

U.S. PATENT DOCUMENTS

| | | | |
|---|---|---|---|
| 7,703,986 B2 * | 4/2010 | Naito | 384/526 |
| 2007/0230849 A1 | 10/2007 | Naito | |
| 2007/0280572 A1 * | 12/2007 | Coicaud | 384/463 |
| 2009/0110340 A1 | 4/2009 | Ito | |
| 2013/0330031 A1 * | 12/2013 | Mineno et al. | 384/470 |
| 2014/0064649 A1 * | 3/2014 | Fukama et al. | 384/484 |

FOREIGN PATENT DOCUMENTS

| | | | |
|---|---|---|---|
| FR | 2912478 A1 * | 8/2008 | |
| JP | 2590329 Y2 * | 2/1999 | |
| JP | 2006-17301 | 1/2006 | |
| JP | 2007-040383 | 2/2007 | |
| JP | 2008-115903 | 5/2008 | |
| JP | 2008-121817 | 5/2008 | |
| JP | 2009-108956 | 5/2009 | |
| WO | 2009/131139 | 10/2009 | |
| WO | WO 2013157485 A1 * | 10/2013 | |

OTHER PUBLICATIONS

International Preliminary Report on Patentability and Written Opinion of the International Searching Authority issued Apr. 25, 2013 in International (PCT) Application No. PCT/JP2011/070337.

International Search Report issued Oct. 4, 2011 in International (PCT) Application No. PCT/JP2011/070337.

* cited by examiner

ROLLING BEARING

TECHNICAL FIELD

The present invention relates to a rolling bearing in which a synthetic resin retainer for rollably retaining rolling elements is interposed between an inner race and an outer race.

BACKGROUND ART

For example, in a gear support shaft of a transmission of a vehicle including an engine, various types of rolling bearings, such as a deep groove ball bearing and an angular contact ball bearing, are widely used.

A ball bearing of this type includes the following as main components: an inner race having a radially outer surface in which an inner raceway surface is formed; an outer race arranged on an outer side of the inner race, and having a radially inner surface in which an outer raceway surface is formed; a plurality of balls interposed between the inner raceway surface of the inner race and the outer raceway surface of the outer race so as to be rollable; and a retainer arranged between the inner race and the outer race, for retaining the balls equiangularly. Any one of the inner race and the outer race is mounted to a stationary part such as a housing, and another one of the inner race and the outer race is mounted to a rotary part such as a rotation shaft.

When the ball bearing is used under oil bath lubrication, the rotating retainer acts like a compressor of a pump, and a lubricating oil is excessively drawn into an inside of the bearing through spaces between the retainer and the inner race and between the retainer and the outer race. The lubricating oil that is thus drawn is stirred in the inside of the bearing by the balls and the retainer, and hence resistance of the lubricating oil to stirring increases torque (heat generation) of the bearing. In particular, high-speed rotation of a motor is input in an electric vehicle and a hybrid vehicle, and hence the rotary part such as a rotation shaft tends to rotate at high speed. As a result, an influence of the above-mentioned resistance to stirring cannot be ignored.

In this context, there have been proposed various bearings including means for restricting an inflow of the lubricating oil into the inside of the bearing (for example, see Patent Literatures 1 and 2).

The bearing apparatus disclosed in Patent Literature 1 has the following configuration. Specifically, the labyrinth forming member having a disk shape is arranged in a press-contact state on the small-diameter-side end surface of the inner race so as to face the flange portion which is formed on the small diameter end side of the retainer to extend radially inward. The labyrinth structure is formed between the labyrinth forming member and the flange portion formed on the small diameter end side of the retainer. This configuration prevents the lubricating oil from being excessively drawn into the inside of the bearing.

Further, the rolling bearing disclosed in Patent Literature 2 has the following structure. Specifically, the narrow guide gap is formed between the retainer and the inner race and between the retainer and the outer race, and the lubricant-inflow-side end surface of the retainer is formed into the inclined surface. Further, the radially inner surface of the retainer is formed into the inclined surface. In the rolling bearing, the narrow guide gap is formed between the retainer and the inner race and between the retainer and the outer race, and the lubricant-inflow-side end surface of the retainer is formed into the inclined surface, and thus the lubricating oil is prevented from being excessively drawn into the inside of the bearing. Further, the radially inner surface of the retainer is formed into the inclined surface, and thus the lubricating oil, which excessively flows into the inside of the bearing, is actively discharged to an outside of the bearing.

CITATION LIST

Patent Literature 1: JP 2009-108956 A
Patent Literature 2: WO 2009/131139 A1

SUMMARY OF INVENTION

Technical Problems

By the way, in the bearing apparatus disclosed in Patent Literature 1, the labyrinth forming member for forming the labyrinth structure between the retainer and the flange portion is required in addition to the bearing components, and the labyrinth forming member needs to be fixed in a press-contact state on the small-diameter-side end surface of the inner race in the narrow space in the apparatus. As a result, the number of components is increased, and it is extremely difficult to mount the labyrinth forming member. Accordingly, there is a problem in that it is hard to reduce a size of the bearing, the number of components, and assembly man-hours.

Further, even in the case of the rolling bearing disclosed in Patent Literature 2 having the structure in which the narrow guide gap is formed between the retainer and the inner race and between the retainer and the outer race, and in which the lubricant-inflow-side end surface of the retainer is formed into the inclined surface, the rolling bearing includes the straight path into which the lubricating oil flows from the outside of the bearing. Accordingly, an effect of preventing the lubricating oil from flowing into the inside of the bearing is limited. Further, in the case of the structure in which the radially inner surface of the retainer is formed into the inclined surface in order to actively discharge the lubricating oil, to the contrary, the lubricating oil may flow into the inside of the bearing from a side of discharging the lubricating oil. Accordingly, this structure may be said to tend to draw the lubricating oil into the inside of the bearing, and hence has an adverse effect. In addition, when adopting the structure in which the radially inner surface of the retainer is formed into the inclined surface, the retainer has an axially asymmetrical shape, and hence the balls may fall off from the pockets due to deformation of the retainer caused by a centrifugal force under high-speed rotation, or may interfere with other components such as the inner race and the outer race.

Therefore, the present invention has been proposed in view of the above-mentioned problems, and has an object to provide a rolling bearing capable of reducing cost without increasing the number of components and assemblyman-hours, and capable of reliably preventing the lubricating oil from excessively flowing into the inside of the bearing.

Solution to Problems

As technical means for achieving the above-mentioned object, according to the present invention, there is provided a rolling bearing, comprising: an inner race and an outer race, which rotate relative to each other; a plurality of rolling elements, which are interposed between the inner race and the outer race; a retainer, which is arranged between the inner race and the outer race, for retaining the plurality of rolling elements equiangularly, the retainer comprising two annular members which face each other in an axial direction and have opposing surfaces each including hemispherical pockets formed in a plurality of circumferential positions, for receiving the plurality of rolling elements, the two annular members being coupled together so that the opposing surfaces are brought into abutment on each other; a flange portion, which extends radially and is provided on at least one of a radially inner side and a radially outer side of an axial end portion of each of the two annular members; and a recessed groove, which is formed in a region of the inner race corresponding to the flange portion or a region of the outer race corresponding to the flange portion so as to form a labyrinth together with the flange portion. Note that, the description "at least one of a radially inner side and a radially outer side" encompasses all of the following cases: a case where the flange portion is provided on only the radially inner side; a case where the flange portion is provided on only the radially outer side; and a case where the flange portion is provided on each of the radially inner side and the radially outer side.

According to the present invention, the flange portion extending radially is provided on at least one of the radially inner side and the radially outer side of the axial end portion of each annular member, and the recessed groove is formed in the region of the inner race corresponding to the flange portion or the region of the outer race corresponding to the flange portion so as to form the labyrinth together with the flange portion. Accordingly, the labyrinth, which is formed by the flange portion and the recessed groove, reliably prevents the lubricating oil from flowing into the inside of the bearing. Further, the retainer has such an axially symmetrical shape that the flange portion is provided at the axial end portion of each annular member. Accordingly, when a centrifugal force is applied under high-speed rotation, the two annular members forming the retainer prevent their own deformation mutually, to thereby be capable of preventing deformation of the retainer. As a result, it is possible to prevent the rolling elements from falling off from the pockets, and from interfering with other components such as the inner race and the outer race. In addition, the labyrinth is formed by the flange portion provided integrally with each annular member and the recessed groove formed integrally with the inner race, or formed by the flange portion and the recessed groove formed integrally with the outer race, and hence it is only necessary to change shapes of the retainer, the inner race, and the outer race. Accordingly, the number of components and assembly man-hours can be reduced, which facilitates cost reduction.

According to the present invention, it is desired that the flange portion have an axial thickness of 0.15 mm or more, and the axial thickness be set to 20% or less of a diameter of each of the plurality of rolling elements. Thus, when the axial thickness of the flange portion is limited within the above-mentioned range, strength of the flange portion can be ensured, and forming of the flange portion is facilitated. As a result, an axial dimension of the bearing is not increased. Note that, when the axial thickness of the flange portion is smaller than 0.15 mm, poor strength of the flange portion and poor forming thereof are more likely to be caused. Further, when the axial thickness of the flange portion is larger than 20% of the diameter of each rolling element, axial dimensions of the inner race and the outer race are increased along with increase in axial dimension of the retainer, and hence the bearing is increased in size.

Further, the flange portion according to the present invention may have such a shape as to extend in a direction orthogonal to the axial direction, or may have such a shape as to extend obliquely with respect to the direction orthogonal to the axial direction. Even when the flange portion has any one of the above-mentioned shapes, the flange portion can form the labyrinth together with the recessed groove formed in the inner race or the outer race. Note that, in a case where the flange portion is inclined with respect to the direction orthogonal to the axial direction, the flange portion may be inclined axially outward or axially inward.

According to the present invention, it is desired that the retainer comprise: a radially-outer-side protrusion, which is formed through axially extending a radially outer side of a circumferential end portion of each of the hemispherical pockets of one of the two annular members, the radially-outer-side protrusion having an inner peripheral surface capable of being held in contact with one of the plurality of rolling elements; a radially-inner-side recess, which is formed through recessing a radially inner side of the circumferential end portion of the each of the hemispherical pockets of the one of the two annular members; a radially-inner-side protrusion, which is formed through axially extending a radially inner side of a circumferential end portion of each of the hemispherical pockets of another one of the two annular members, the radially-inner-side protrusion having an inner peripheral surface capable of being held in contact with the one of the plurality of rolling elements; and a radially-outer-side recess, which is formed through recessing a radially outer side of the circumferential end portion of the each of the hemispherical pockets of the another one of the two annular members, that the radially-outer-side protrusion and the radially-inner-side protrusion be engaged with each other in the axial direction so that the radially-outer-side protrusion is inserted into the radially-outer-side recess and the radially-inner-side protrusion is inserted into the radially-inner-side recess, and that the radially-outer-side protrusion and the radially-inner-side protrusion each have an engaging surface, and the engaging surface be inclined with respect to the axial direction so that a distal end side of the radially-outer-side protrusion or the radially-inner-side protrusion is thicker than a proximal end side thereof.

According to this structure, the radially-outer-side protrusion and the radially-inner-side protrusion are engaged with each other in the axial direction, and thus a frictional force is generated along the engaging surface of the radially-outer-side protrusion and the engaging surface of the radially-inner-side protrusion. Further, the engaging surface of the radially-outer-side protrusion is inclined with respect to the axial direction so that the distal end side of the radially-outer-side protrusion is thicker than the proximal end side thereof, and the engaging surface of the radially-inner-side protrusion is inclined with respect to the axial direction so that the distal end side of the radially-inner-side protrusion is thicker than the proximal end side thereof. As a result, there is generated an axial component of a reaction force which is generated in a normal direction of the engaging surface of the radially-outer-side protrusion and a normal direction of the engaging surface of the radially-inner-side protrusion. Even in a case where a large centrifugal force is applied due to high-speed rotation, owing to a synergy between the frictional force generated along the engaging surface of the radially-outer-side protrusion and the engaging surface of the radially-inner-side protrusion, and the axial component of the reaction force generated in the normal directions of the engaging surfaces, it is possible to reliably prevent the two annular members from separating from each other axially.

According to the present invention, it is desired that the engaging surface of the radially-outer-side protrusion and the engaging surface of the radially-inner-side protrusion each have an inclination angle of 5° or more. When the inclination angle is set in this range, it is easy to prevent deformation of the engaging surfaces even when a large centrifugal force is applied due to high-speed rotation. As a result, the axial component of the reaction force can be reliably caused to act on the engaging surfaces, and hence it is easy to ensure a coupling force between the two annular members. Note that, when each of the engaging surfaces has an inclination angle of less than 5°, in a case where a large centrifugal force is applied due to high-speed rotation, it is difficult to prevent deformation of the engaging surfaces, and hence it is hard to reliably cause the axial component of the reaction force to act on the engaging surfaces.

According to the present invention, it is desired to adopt the structure in which the radially-inner-side protrusion is thicker than the radially-outer-side protrusion. With this structure, when a large centrifugal force is applied due to high-speed rotation, the radially-inner-side protrusion, which is thicker than the radially-outer-side protrusion, is larger in mass than the radially-outer-side protrusion, and hence the radially-inner-side protrusion is deformed to a larger extent than the radially-outer-side protrusion. Here, the engaging surface of the radially-outer-side protrusion is inclined with respect to the axial direction so that the distal end side of the radially-outer-side protrusion is thicker than the proximal end side thereof, and the engaging surface of the radially-inner-side protrusion is inclined with respect to the axial direction so that the distal end side of the radially-inner-side protrusion is thicker than the proximal end side thereof. Accordingly, deformation of the radially-inner-side protrusion acts so as to increase the coupling force between the engaging surface of the radially-outer-side protrusion and the engaging surface of the radially-inner-side protrusion.

According to the present invention, it is desired to adopt the structure in which the radially-outer-side protrusion and the radially-inner-side recess are formed at one circumferential end portion of each of the hemispherical pockets, and the radially-inner-side protrusion and the radially-outer-side recess are formed at another circumferential end portion of the each of the hemispherical pockets. With this structure, annular members of one type, which are manufactured using one mold, can be used as one annular member and another annular member, and hence product cost can be reduced.

In view of achieving reduction in weight of the retainer, according to the present invention, it is effective that the two annular members be made of a synthetic resin. Further, in consideration of cost and resistance against oil, it is desired that the two annular members be made of one synthetic resin selected from PPS, PA66, and PA46.

Advantageous Effects of Invention

According to the present invention, the flange portion extending radially is provided on at least one of the radially inner side and the radially outer side of the axial end portion of each annular member, and the recessed groove is formed in the region of the inner race corresponding to the flange portion or the region of the outer race corresponding to the flange portion so as to form the labyrinth together with the flange portion. Accordingly, the labyrinth, which is formed by the flange portion and the recessed groove, reliably prevents the lubricating oil from excessively flowing into the inside of the bearing. Further, the retainer has such an axially symmetrical shape that the flange portion is provided at the axial end portion of each annular member. Accordingly, when a centrifugal force is applied under high-speed rotation, the two annular members forming the retainer prevent their own deformation mutually, to thereby be capable of preventing deformation of the retainer. As a result, it is possible to prevent the rolling elements from falling off from the pockets, and from interfering with other components such as the inner race and the outer race. In addition, the labyrinth is formed by the flange portion provided integrally with each annular member and the recessed groove formed integrally with the inner race, or formed by the flange portion and the recessed groove formed integrally with the outer race, and hence it is only necessary to change shapes of the retainer, the inner race, and the outer race. Accordingly, the number of components and assembly man-hours can be reduced, which facilitates cost reduction. As a result, it is possible to provide a rolling bearing which is used in an automobile and suitable for a high-speed rotation bearing employed in an electric vehicle and a hybrid vehicle.

DESCRIPTION OF EMBODIMENTS

A ball bearing as a rolling bearing according to an embodiment of the present invention is described in detail below. The ball bearing according to this embodiment is suitable particularly for a high-speed rotation bearing which is used in an automobile and employed under oil bath lubrication in an electric vehicle and a hybrid vehicle.

Figure 1:
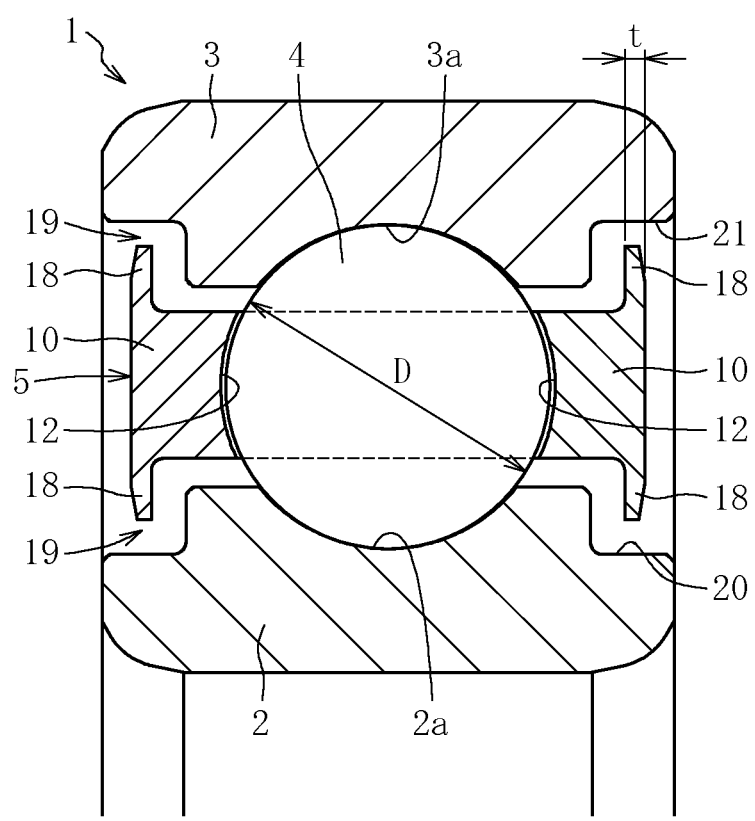
FIG. 1 An enlarged cross-sectional view illustrating a main part of a ball bearing as a rolling bearing according to an embodiment of the present invention.

As illustrated in FIG. 1, a ball bearing 1 according to this embodiment comprises the following as main components: an inner race 2 having a radially outer surface in which an inner raceway surface 2a is formed; an outer race 3 being arranged on an outer side of the inner race 2, and having a radially inner surface in which an outer raceway surface 3a is formed; balls 4 serving as a plurality of rolling elements interposed between the inner raceway surface 2a of the inner race 2 and the outer raceway surface 3a of the outer race 3 so as to be rollable; and a retainer 5 arranged between the inner race 2 and the outer race 3, for retaining the balls 4 equiangularly. Any one of the inner race 2 and the outer race 3 is mounted to a stationary part such as a housing, and another one of the inner race 2 and the outer race 3 is mounted to a rotary part such as a rotation shaft.

Figure 2:
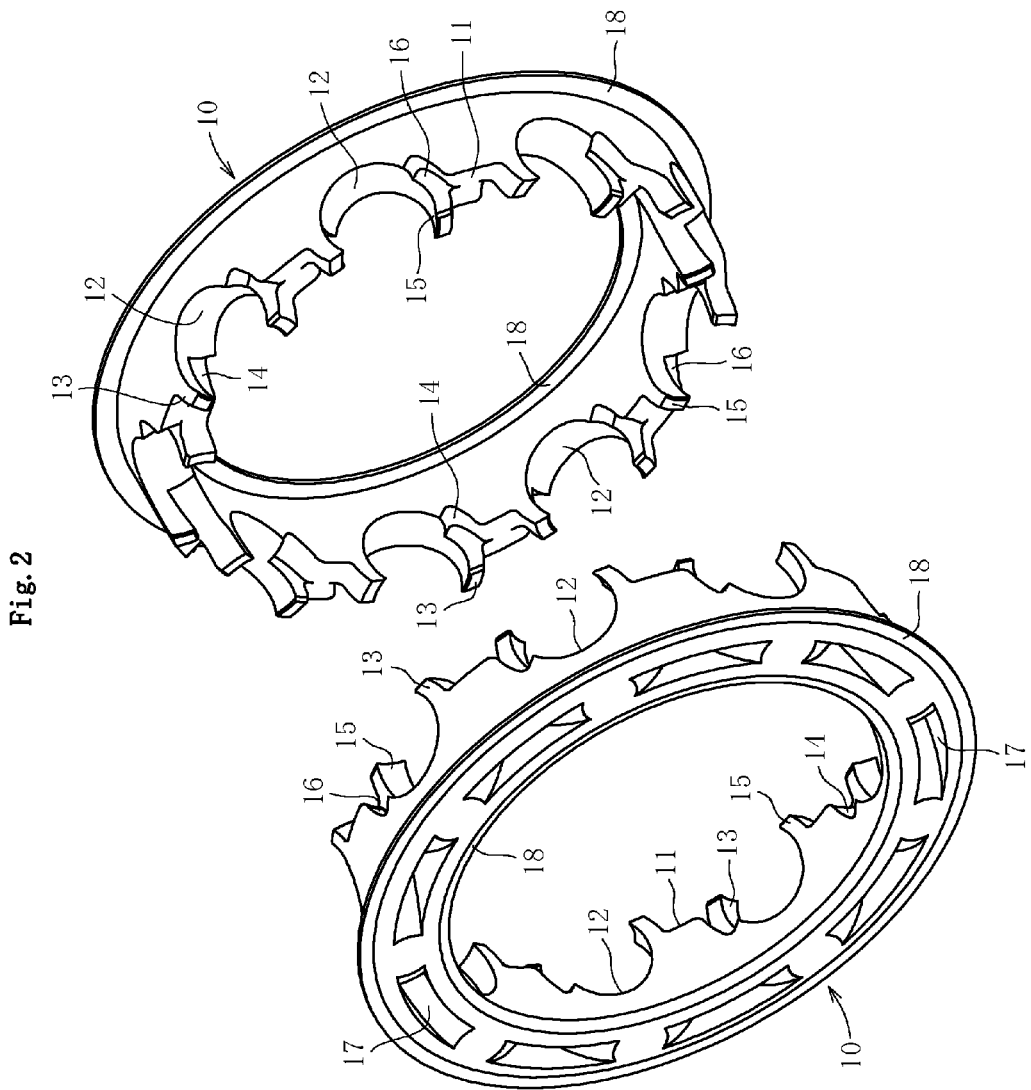
FIG. 2 An exploded perspective view illustrating two annular members forming a retainer illustrated in FIG. 1.
Figure 3:
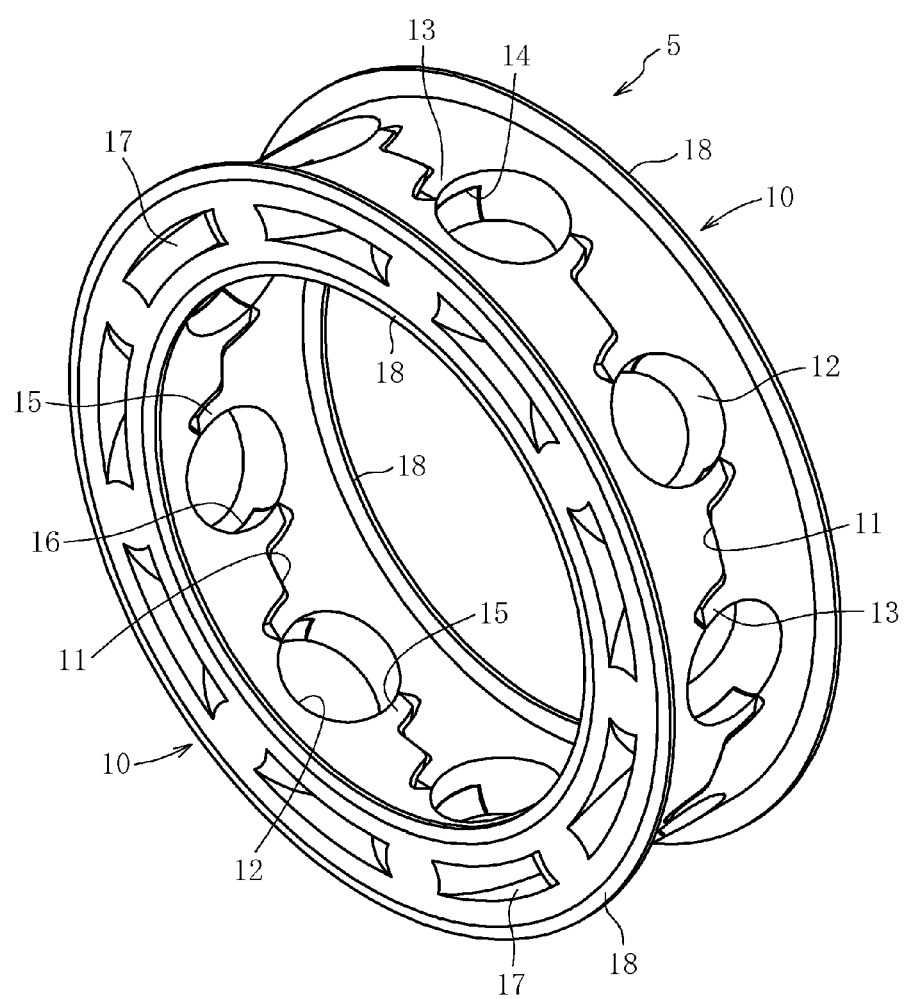
FIG. 3 A perspective view illustrating the assembled two annular members forming the retainer illustrated in FIG. 1.

The ball bearing 1 comprises the lightweight and synthetic resin retainer 5 which is designed in order to prevent deformation of the retainer 5 caused by a centrifugal force under high-speed rotation. As illustrated in FIGS. 2 and 3, the retainer 5 of this type has the following symmetrical shape. Specifically, two annular members 10 face each other in an axial direction, and each have an opposing surface 11 including hemispherical pockets 12 formed in a plurality of circumferential positions, for receiving the balls 4 (see FIG. 1). The two annular members 10 are coupled together so that the opposing surfaces 11 of the annular members 10 are brought into abutment on each other. In each of the two annular members 10, a recessed hollow portion 17 is formed in a region between adjacent pockets 12, and thus the retainer 5 is further reduced in weight. Note that, FIG. 2 illustrates a state before the two annular members 10 are coupled together, and FIG. 3 illustrates a state after the two annular members 10 are coupled together.

When the ball bearing 1 is used under oil bath lubrication, the rotating retainer 5 acts like a compressor of a pump, and a lubricant is drawn into an inside of the bearing through spaces between the retainer 5 and the inner race 2 and between the retainer 5 and the outer race 3. Accordingly, the ball bearing 1 according to this embodiment has the following structure as means for restricting an inflow of the lubricant into the inside of the bearing. That is, a flange portion 18 extending radially is provided on each of a radially inner side and a radially outer side of an axial end portion of each annular member 10 (see FIGS. 2 and 3). A recessed groove 20 is formed in a region of the inner race 2 corresponding to the flange portion 18, and a recessed groove 21 is formed in a region of the outer race 3 corresponding to the flange portion 18. Each of the recessed grooves 20, 21 forms a labyrinth 19 together with the flange portion 18 (see FIG. 1).

The above-mentioned flange portion 18 is formed so as to extend in a direction orthogonal to the axial direction. On the other hand, the recessed groove 20 on the inner race side is formed through recessing an axial end portion of the radially outer surface of the inner race 2 in a stepped manner, and the recessed groove 21 on the outer race side is formed through recessing an axial end portion of the radially inner surface of the outer race 3 in a stepped manner. Note that, the flange portion 18 of the retainer 5, and the recessed groove 20 of the inner race 2 or the recessed groove 21 of the outer race 3 do not have a constantly-contact positional relationship. That is, the flange portion 18, and the recessed groove 20 or the recessed groove 21 have a contact positional relationship only under a specified condition, or have a completely non-contact positional relationship.

As described above, the labyrinth 19, which is formed by the flange portion 18 of the retainer 5 and the recessed groove 20 of the inner race 2 or by the flange portion 18 and the recessed groove 21 of the outer race 3, reliably prevents a lubricating oil from excessively flowing into the inside of the bearing. Further, the retainer 5 has such an axially symmetrical shape that the flange portions 18 are provided at an axial end portion of each annular member 10. Accordingly, when a centrifugal force is applied under high-speed rotation, the two annular members 10 forming the retainer 5 prevent their own deformation mutually, to thereby be capable of preventing deformation of the retainer 5. As a result, it is possible to prevent the balls 4 from falling off from the pockets 12, and from interfering with other components such as the inner race 2 and the outer race 3. In addition, the labyrinth 19 is formed by the flange portion 18 provided integrally with the annular member 10 and the recessed groove 20 formed integrally with the inner race 2, or formed by the flange portion 18 and the recessed groove 21 formed integrally with the outer race 3, and hence it is only necessary to change shapes of the retainer 5, the inner race 2, and the outer race 3. Accordingly, the number of components and assemblyman-hours can be reduced, which facilitates cost reduction.

In this embodiment, as illustrated in FIG. 1, the flange portion 18 has an axial thickness t of 0.15 mm or more, and the axial thickness t is set to 20% or less of a diameter D of each ball 4. Thus, when the axial thickness t of the flange portion 18 is limited within the above-mentioned range, strength of the flange portion 18 can be ensured, and forming of the flange portion 18 is facilitated. As a result, an axial dimension of the bearing is not increased. Note that, when the axial thickness t of the flange portion 18 is smaller than 0.15 mm, poor strength of the flange portion 18 and poor forming thereof are more likely to be caused. Further, when the axial thickness t of the flange portion 18 is larger than 20% of the diameter D of the ball 4, it is necessary to increase an axial dimension (groove width) of the recessed groove 20 of the inner race 2 and an axial dimension (groove width) of the recessed groove 21 of the outer race 3 in order to prevent the flange portion 18 of the retainer 5 from protruding from an end surface of the bearing. As a result, the axial dimension of the inner race 2 and the axial dimension of the outer race 3 are increased, and hence the entire bearing is increased in size.

The retainer 5 according to this embodiment has the following coupling structure as means for coupling the above-mentioned two annular members 10 together.

Figure 4:
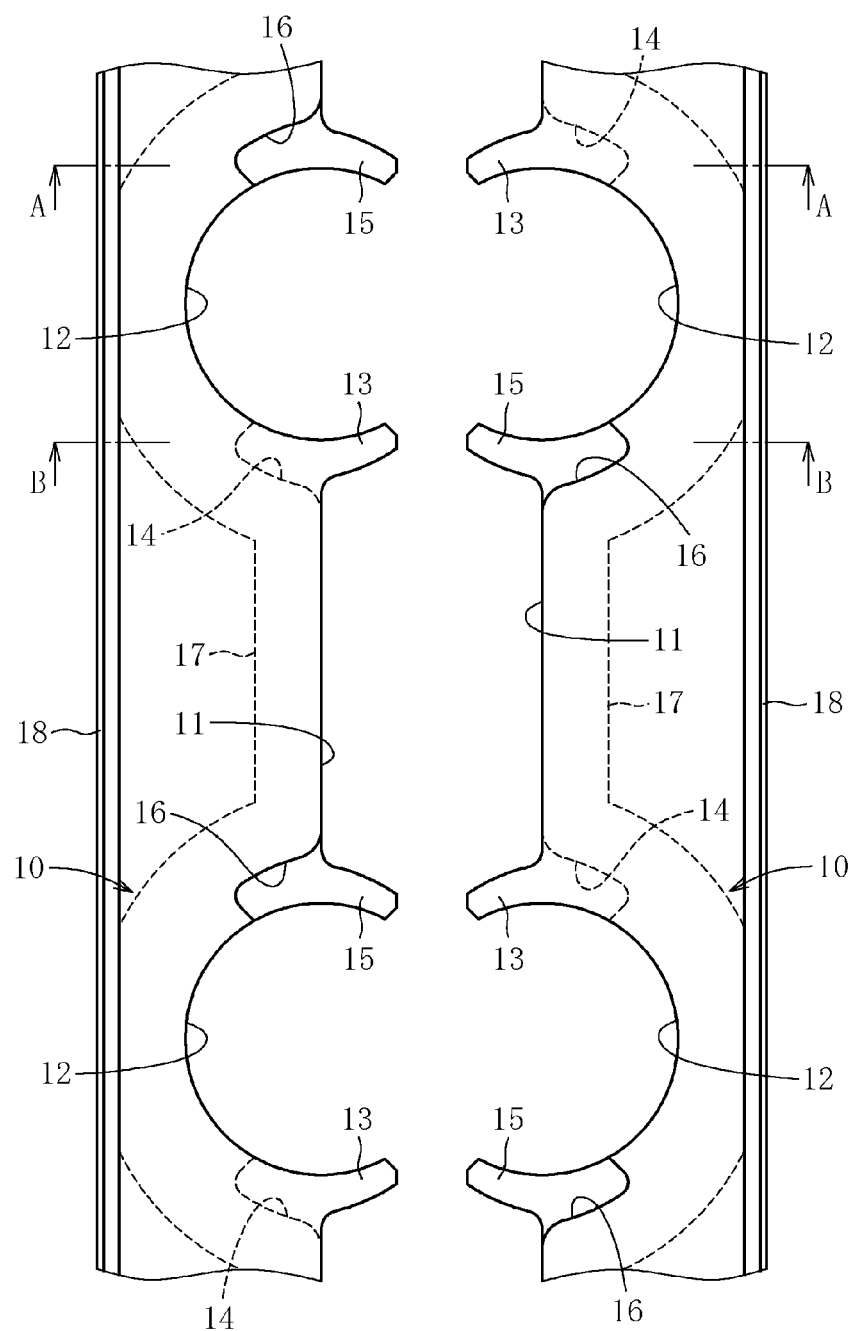
FIG. 4 A partial developed view illustrating the two annular members before coupling.
Figure 5:
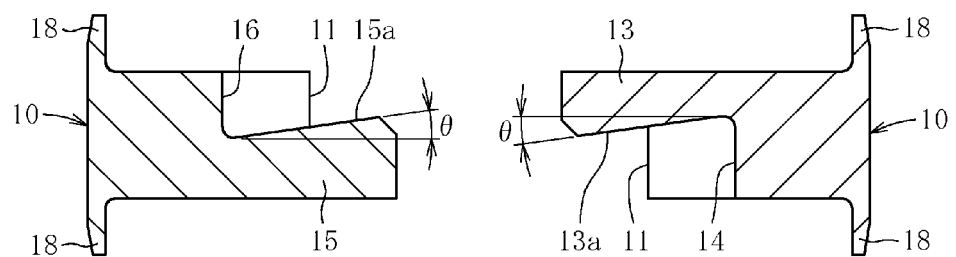
FIG. 5 A cross-sectional view taken along the line A-A of FIG. 4.
Figure 6:
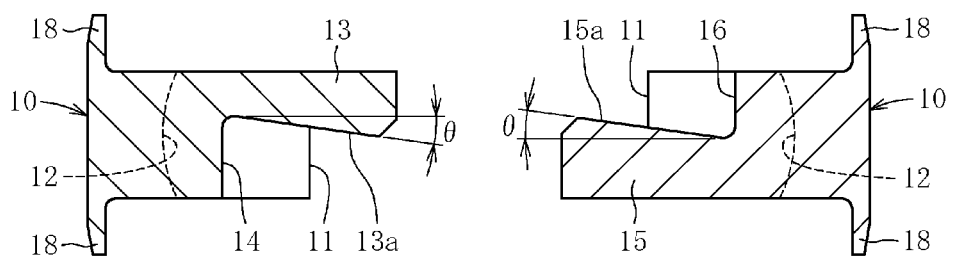
FIG. 6 A cross-sectional view taken along the line B-B of FIG. 4.

FIG. 4 illustrates the two annular members 10 before coupling. FIG. 5 is a cross-sectional view taken along the line A-A of FIG. 4. FIG. 6 is a cross-sectional view taken along the line B-B of FIG. 4. As illustrated in FIGS. 4 to 6, each of the two annular members 10 comprises: a radially-outer-side protrusion 13 formed through axially extending a radially outer side of one circumferential end portion of each pocket 12; a radially-inner-side recess 14 formed through recessing a radially inner side of the one circumferential end portion of each pocket 12; a radially-inner-side protrusion 15 formed through axially extending a radially inner side of another circumferential end portion of each pocket 12; and a radially-outer-side recess 16 formed through recessing a radially outer side of the another circumferential end portion of each pocket 12.

As described above, there is adopted structure in which, in each of the two annular members 10, the radially-outer-side protrusion 13 and the radially-inner-side recess 14 are formed at one circumferential end portion of each pocket 12, and the radially-inner-side protrusion 15 and the radially-outer-side recess 16 are formed at another circumferential end portion of each pocket 12. Accordingly, the annular members 10 of one type, which are manufactured using one mold, can be used as one annular member 10 and another annular member 10, and hence product cost can be reduced.

In this structure, the radially-outer-side protrusion 13 of one annular member 10 is inserted into the radially-outer-side recess 16 of another annular member 10, and the radially-inner-side protrusion 15 of the one annular member 10 is inserted into the radially-inner-side recess 14 of the another annular member 10. Thus, the radially-outer-side protrusion 13 and the radially-inner-side protrusion 15 are engaged with each other in the axial direction. Further, an engaging surface 13a of the radially-outer-side protrusion 13 is inclined with respect to the axial direction so that a distal end side of the radially-outer-side protrusion 13 is thicker than a proximal end side thereof, and an engaging surface 15a of the radially-inner-side protrusion 15 is inclined with respect to the axial direction so that a distal end side of the radially-inner-side protrusion 15 is thicker than a proximal end side thereof (see FIGS. 5 and 6).

Figure 7:
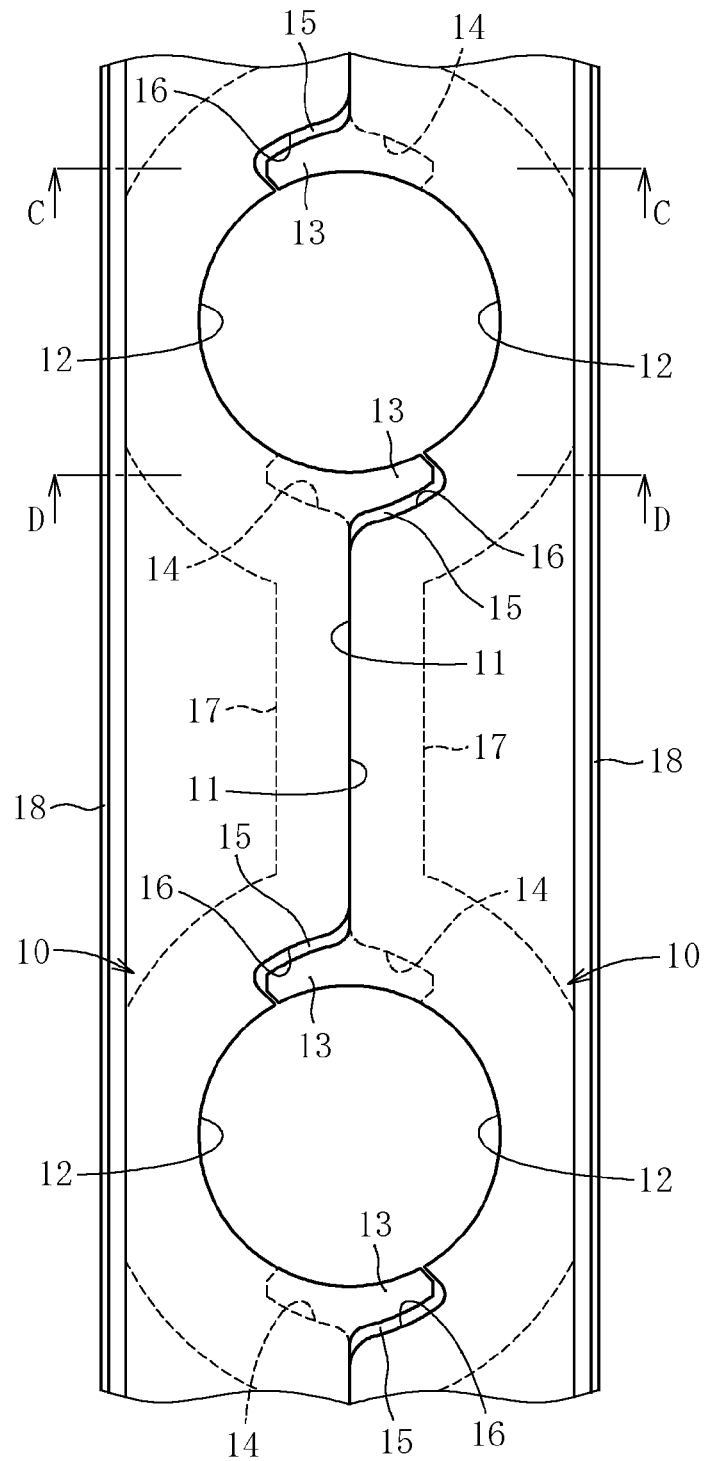
FIG. 7 A partial developed view illustrating the two annular members after coupling.
Figure 8:
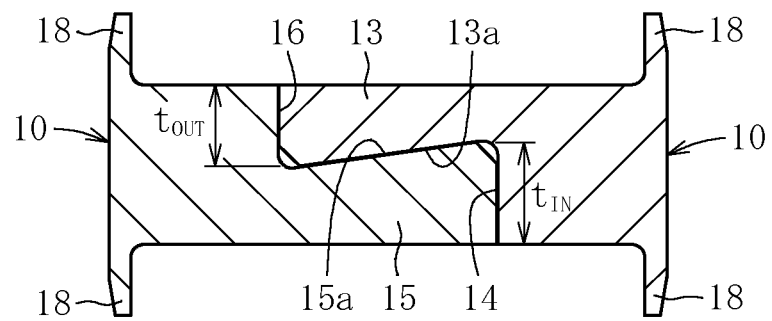
FIG. 8 A cross-sectional view taken along the line C-C of FIG. 7.
Figure 9:
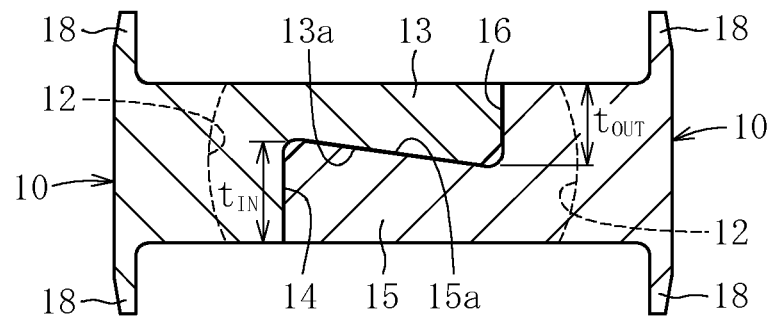
FIG. 9 A cross-sectional view taken along the line D-D of FIG. 7.

FIG. 7 illustrates the two annular members 10 after coupling. FIG. 8 is a cross-sectional view taken along the line C-C of FIG. 7. FIG. 9 is a cross-sectional view taken along the line D-D of FIG. 7. As illustrated in FIGS. 7 to 9, the opposing surfaces 11 of the two annular members 10 are brought into abutment on each other, and the radially-outer-side protrusion 13 and the radially-inner-side protrusion 15 are engaged with each other in the axial direction with a predetermined interference. Thus, a frictional force is generated along the engaging surface 13a of the radially-outer-side protrusion 13 and the engaging surface 15a of the radially-inner-side protrusion 15. Further, the engaging surface 13a of the radially-outer-side protrusion 13 is inclined with respect to the axial direction so that the distal end side of the radially-outer-side protrusion 13 is thicker than the proximal end side thereof, and the engaging surface 15a of the radially-inner-side protrusion 15 is inclined with respect to the axial direction so that the distal end side of the radially-inner-side protrusion 15 is thicker than the proximal end side thereof. As a result, there is generated an axial component of a reaction force which is generated in a normal direction of the engaging surface 13a of the radially-outer-side protrusion 13 and a normal direction of the engaging surface 15a of the radially-inner-side protrusion 15.

Even in a case where a large centrifugal force is applied due to high-speed rotation, owing to a synergy between the frictional force generated along the engaging surface 13a of the radially-outer-side protrusion 13 and the engaging surface 15a of the radially-inner-side protrusion 15, and the axial component of the reaction force generated in the normal direction of the engaging surface 13a and the normal direction of the engaging surface 15a, it is possible to reliably prevent the two annular members 10 from separating from each other axially.

As described above, a coupling section comprising the radially-outer-side protrusion 13, the radially-inner-side recess 14, the radially-inner-side protrusion 15, and the radially-outer-side recess 16 is provided at both circumferential end portions of each pocket 12 of the annular member 10. Accordingly, in a case where a large centrifugal force is applied due to high-speed rotation, even when one annular member 10 and another annular member 10 separate from each other axially outward and thus the pockets 12 are to be opened, the above-mentioned coupling section easily maintains a state in which the balls 4 are received in the pockets (see FIG. 7).

In the coupling structure according to this embodiment, each of the engaging surface 13a of the radially-outer-side protrusion 13 and the engaging surface 15a of the radially-inner-side protrusion 15 is required to have an inclination angle θ of 5° or more (see FIGS. 5 and 6). The inclination angle θ is set in this range, and hence it is easy to prevent deformation of the engaging surface 13a and the engaging surface 15a even when a large centrifugal force is applied due to high-speed rotation. As a result, the axial component of the reaction force can be reliably caused to act on the engaging surface 13a and the engaging surface 15a, and hence it is easy to ensure a coupling force between the two annular members 10. Note that, when each of the engaging surface 13a and the engaging surface 15a has an inclination angle θ of less than 5°, in a case where a large centrifugal force is applied due to high-speed rotation, it is difficult to prevent deformation of the engaging surface 13a and the engaging surface 15a, and hence it is hard to reliably cause the axial component of the reaction force to act on the engaging surface 13a and the engaging surface 15a.

Further, as illustrated in FIGS. 8 and 9, in the coupling structure, the radially-inner-side protrusion 15 is thicker than the radially-outer-side protrusion 13 ($t_{IN} > t_{OUT}$). Thus, the radially-inner-side protrusion 15 is thicker than the radially-outer-side protrusion 13, and hence when a large centrifugal force is applied due to high-speed rotation, the radially-inner-side protrusion 15 is deformed to a larger extent than the radially-outer-side protrusion 13. This is because the radially-inner-side protrusion 15, which is thicker than the radially-outer-side protrusion 13, is larger in mass than the radially-outer-side protrusion 13. Here, the engaging surface 13a of the radially-outer-side protrusion 13 is inclined with respect to the axial direction so that the distal end side of the radially-outer-side protrusion 13 is thicker than the proximal end side thereof, and the engaging surface 15a of the radially-inner-side protrusion 15 is inclined with respect to the axial direction so that the distal end side of the radially-inner-side protrusion 15 is thicker than the proximal end side thereof. Accordingly, deformation of the radially-inner-side protrusion 15 acts so as to increase the coupling force between the engaging surface 13a of the radially-outer-side protrusion 13 and the engaging surface 15a of the radially-inner-side protrusion 15.

The above-mentioned two annular members 10 are made of a synthetic resin in view of achieving reduction in weight of the retainer 5. Here, in consideration of cost and resistance against oil, it is effective that the annular members 10 be made of one synthetic resin selected from polyphenylene sulfide (PPS), polyamide 66 (PA66), and polyamide 46 (PA46). For example, in a case where an oil for use contains a large amount of components (phosphorus, sulfur) having aggressiveness with respect to a resin, it is preferred to use PPS because PPS, PA46, and PA66 satisfy the relation PPS>PA46>PA66 regarding resistance against oil. Further, in consideration of cost of a resin material, PPS, PA46, and PA66 satisfy the relation PA66>PA46>PPS regarding cost, and hence it is desired to select a material in consideration of the aggressiveness of the oil for use with respect to a resin. Note that, as other resin materials, polyamide 9T (PA9T), polyether ether ketone (PEEK), and a phenol resin can be used.

Figure 10:
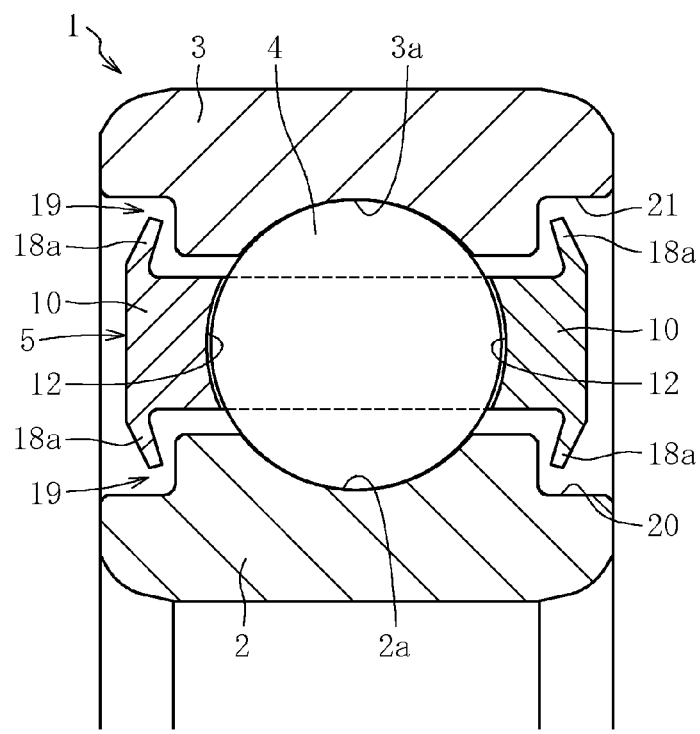
FIG. 10 An enlarged cross-sectional view illustrating a main part of a ball bearing according to another embodiment of the present invention.
Figure 11:
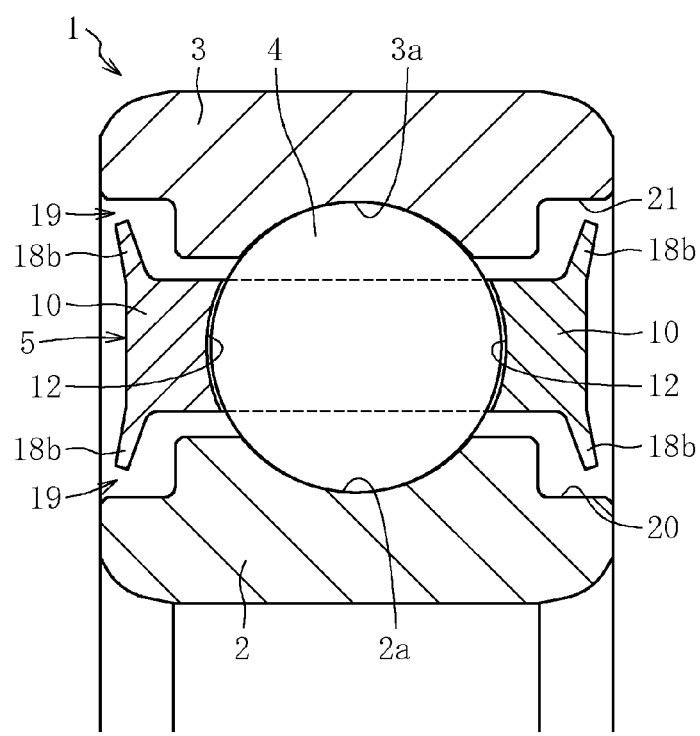
FIG. 11 An enlarged cross-sectional view illustrating a main part of a ball bearing according to still another embodiment of the present invention.

Note that, in the above-mentioned embodiment, description is made of the case where the flange portion 18 is formed so as to extend in a direction orthogonal to the axial direction, but the present invention is not limited thereto. The flange portion may be formed so as to extend obliquely with respect to the direction orthogonal to the axial direction. That is, as illustrated in FIG. 10, a flange portion 18a may be bent axially inward. Alternatively, as illustrated in FIG. 11, a flange portion 18b may be bent axially outward. Any of the flange portions 18a, 18b, which are shaped in the above-mentioned manner, can form the labyrinth 19 together with the recessed groove 20 of the inner race 2 or the recessed groove 21 of the outer race 3.

Further, in the above-mentioned embodiment, description is made of the case where the flange portion 18 is provided on each of the radially inner side and the radially outer side of the axial end portion of the retainer 5, but the present invention is not limited thereto. Although not shown, the flange portion 18 may be provided on only any one of the radially inner side and the radially outer side of the axial end portion of the retainer 5.

The present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

The invention claimed is:

1. A rolling bearing, comprising:
an inner race and an outer race, which rotate relative to each other;
a plurality of rolling elements, which are interposed between the inner race and the outer race;
a retainer, which is arranged between the inner race and the outer race, for retaining the plurality of rolling elements equiangularly, the retainer comprising two annular members which face each other in an axial direction and have opposing surfaces each including hemispherical pockets formed in a plurality of circumferential positions, for receiving the plurality of rolling elements, the two annular members being coupled together so that the opposing surfaces are brought into abutment on each other;
a flange portion, which extends radially and is provided on at least one of a radially inner side and a radially outer side of an axial end portion of each of the two annular members; and
a recessed groove, which is formed in a region of the inner race corresponding to the flange portion or a region of the outer race corresponding to the flange portion so as to form a labyrinth together with the flange portion,
wherein the retainer further comprises:
a radially-outer-side protrusion, which is formed through axially extending a radially outer side of a circumferential end portion of each of the hemispherical pockets of one of the two annular members, the radially-outer-side protrusion having an inner peripheral surface capable of being held in contact with one of the plurality of rolling elements;
a radially-inner-side recess, which is formed through recessing a radially inner side of the circumferential end portion of the each of the hemispherical pockets of the one of the two annular members;
a radially-inner-side protrusion, which is formed through axially extending a radially inner side of a circumferential end portion of each of the hemispherical pockets of another one of the two annular members, the radially-inner-side protrusion having an inner peripheral surface capable of being held in contact with the one of the plurality of rolling elements; and
a radially-outer-side recess, which is formed through recessing a radially outer side of the circumferential end portion of the each of the hemispherical pockets of the another one of the two annular members,
wherein the radially-outer-side protrusion and the radially-inner-side protrusion are engaged with each other in the axial direction so that the radially-outer-side protrusion is inserted into the radially-outer-side recess and the radially-inner-side protrusion is inserted into the radially-inner-side recess,
wherein the radially-outer-side protrusion and the radially-inner-side protrusion each have an engaging surface, and the engaging surfaces are inclined with respect to the axial direction so that a distal end side of each of the radially-outer-side protrusion and the radially-inner-side protrusion is thicker than a proximal end side thereof, and
wherein the proximal end side of the radially-inner-side protrusion is thicker than the proximal end side of the radially-outer-side protrusion.

2. A rolling bearing according to claim 1, wherein the flange portion has an axial thickness of 0.15 mm or more, and the axial thickness is set to 20% or less of a diameter of each of the plurality of rolling elements.

3. A rolling bearing according to claim 2, wherein the flange portion extends in a direction orthogonal to the axial direction.

4. A rolling bearing according to claim 2, wherein the flange portion extends obliquely with respect to a direction orthogonal to the axial direction.

5. A rolling bearing according to claim 1, wherein the flange portion extends in a direction orthogonal to the axial direction.

6. A rolling bearing according to claim 1, wherein the flange portion extends obliquely with respect to a direction orthogonal to the axial direction.

7. A rolling bearing according to claim 1, wherein the engaging surface of the radially-outer-side protrusion and the engaging surface of the radially-inner-side protrusion each have an inclination angle of 5° or more.

8. A rolling bearing according to claim 1, wherein the radially-outer-side protrusion and the radially-inner-side recess are formed at one circumferential end portion of each of the hemispherical pockets, and the radially-inner-side protrusion and the radially-outer-side recess are formed at another circumferential end portion of the each of the hemispherical pockets.

9. A rolling bearing according to claim 1, wherein the two annular members are made of a synthetic resin.

10. A rolling bearing according to claim 1, wherein the two annular members are made of one synthetic resin selected from PPS, PA66, and PA46.

11. A rolling bearing according to claim 1, wherein the distal end side of the radially-inner-side protrusion is thicker than the distal end side of the radially-outer-side protrusion.

* * * * *